Feb. 20, 1934.  L. A. ROGGENSACK  1,947,492
MEANS FOR OVERCOMING SIDE DRAFT
Filed Aug. 6, 1932   3 Sheets-Sheet 1
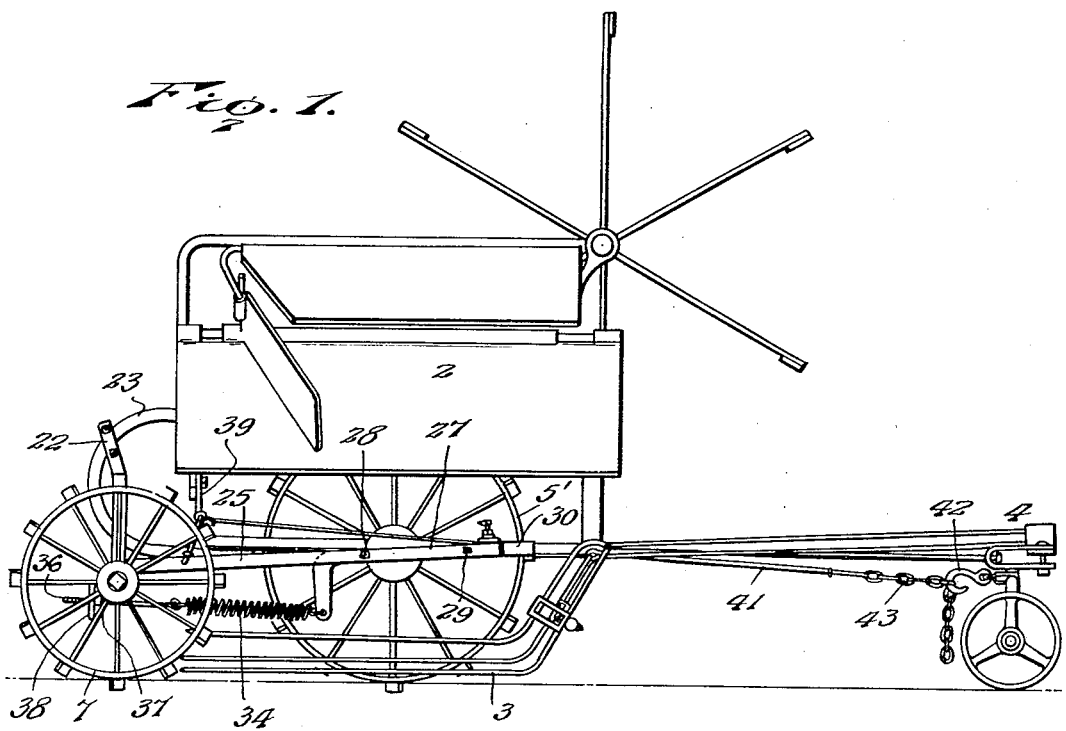
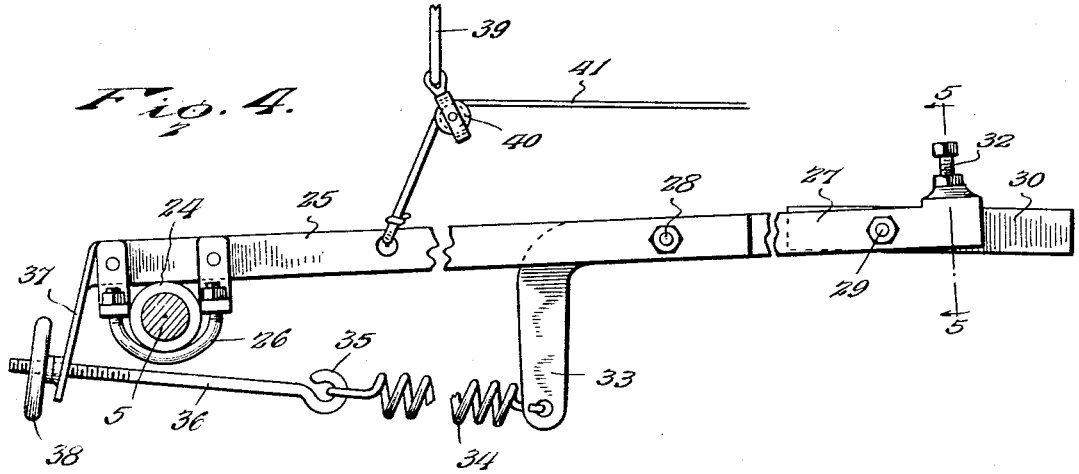
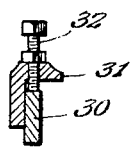
Inventor
L. A. Roggensack.
By Lacey & Lacey, Attorneys

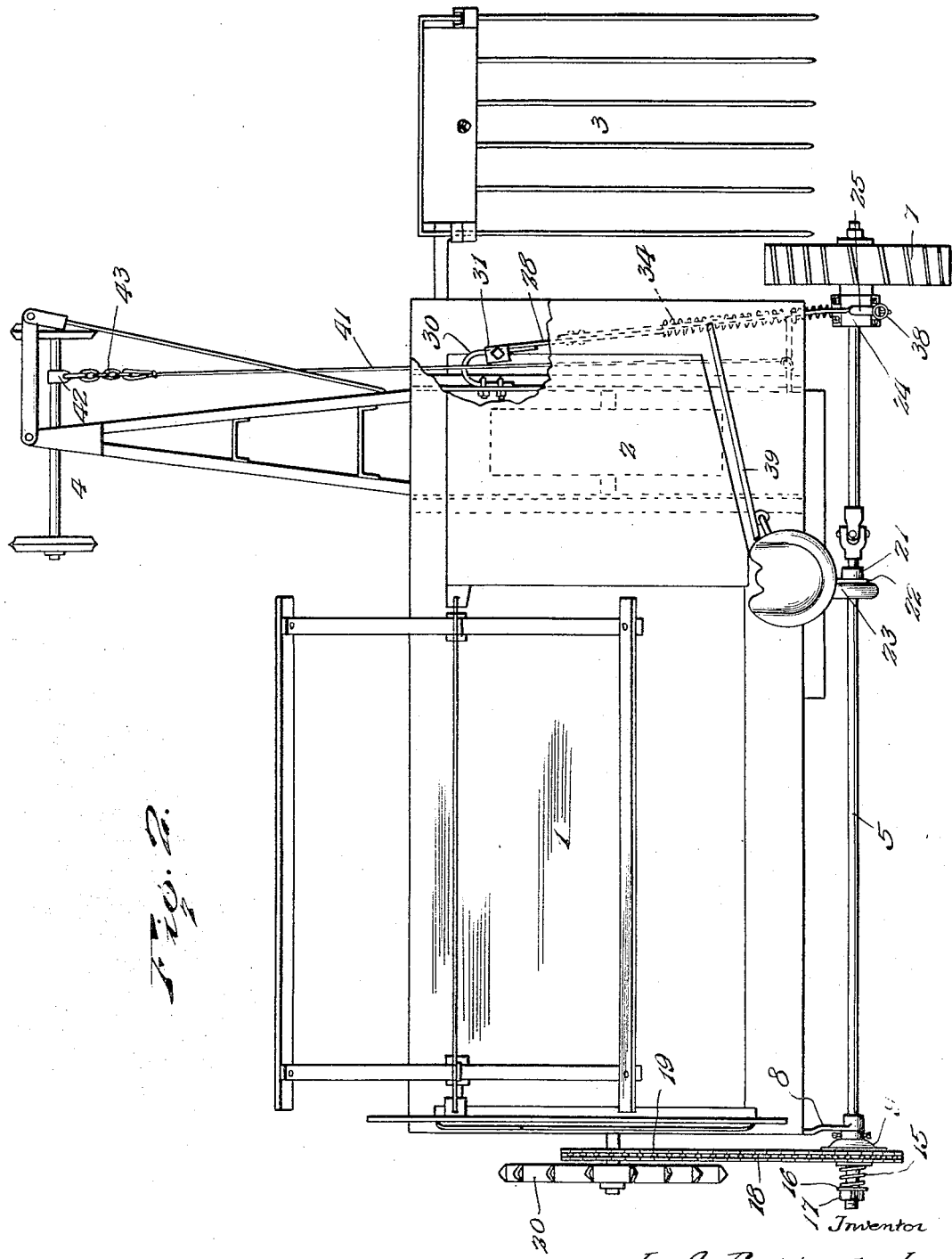

Feb. 20, 1934. L. A. ROGGENSACK 1,947,492
MEANS FOR OVERCOMING SIDE DRAFT
Filed Aug. 6, 1932 3 Sheets-Sheet 3
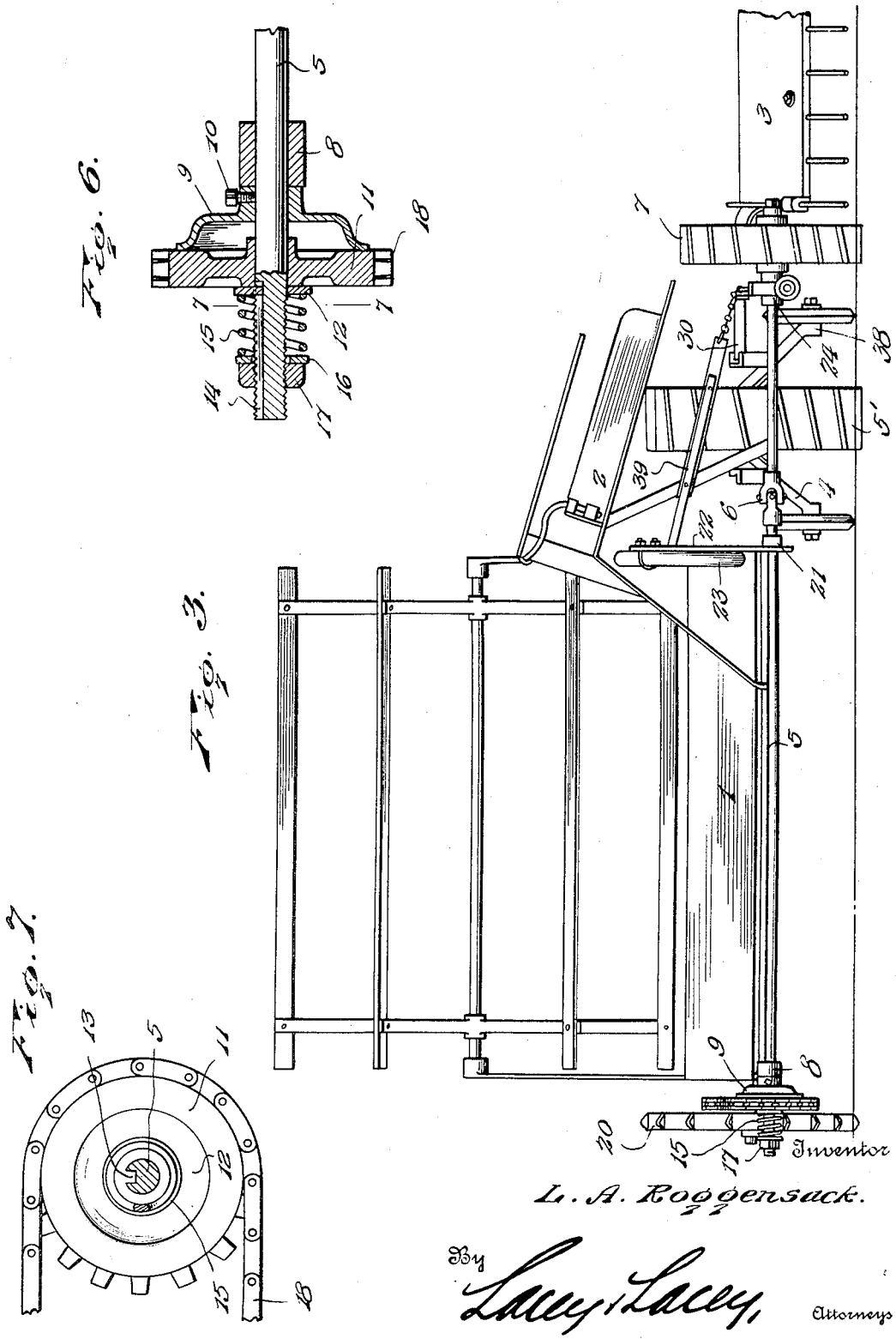

Patented Feb. 20, 1934

1,947,492

UNITED STATES PATENT OFFICE 1,947,492

MEANS FOR OVERCOMING SIDE DRAFT

Lutie A. Roggensack, Moorhead, Minn.

Application August 6, 1932. Serial No. 627,771

7 Claims. (Cl. 56—321)

This invention has for its object the elimination of side draft in agricultural machines and is intended more particularly for application to a binder. The invention is illustrated in the accompanying drawings and consists in certain novel features which will be hereinafter first fully described and then more particularly defined in the appended claims.

In the drawings, Fig. 1 is a side elevation of a binder having the present invention applied thereto, Fig. 2 is a top plan view of the same, Fig. 3 is a rear elevation of the same, Fig. 4 is an enlarged side elevation of the attachment constituting the principal support of the present invention, Fig. 5 is a detail section on the line 5—5 of Fig. 4, Fig. 6 is an enlarged section taken axially through a friction clutch forming a part of the invention, Fig. 7 is a detail elevation, with a part in section, on the line 7—7 of Fig. 6.

The binder comprises the usual platform 1, binder deck 2 and bundle carrier 3 which may be of any known or approved construction, and is illustrated in a more or less conventional manner in order that the invention may be clearly understood. The binder is shown as including a front truck 4 and a bull wheel 5', but the front truck will be omitted when the machine is drawn by a tractor, as will be readily understood by persons skilled in the art.

In carrying out the present invention, a shaft 5 is provided at the rear of the binder and is equipped, between its ends, with a universal joint 6 whereby it may accommodate itself to extreme oscillations of the machine in traveling over a rough field and also facilitate the lifting of the supplemental bull wheel 7 which is secured upon the right hand end of the shaft and disposed to run in a path between the paths of the bull wheel 5' and the bundle carrier 3. The shaft 5 is carried in a bearing bracket 8 which is secured to the binder frame at the left side thereof and adjacent said bearing bracket a friction disk 9 is mounted upon the shaft and secured thereto by a set screw 10, as shown in Fig. 6. A sprocket wheel 11 is loose upon the shaft 5, between the friction disk 9 and the end of the shaft, and at the outer side of said sprocket wheel a washer 12 is fitted upon the shaft and is formed with a tooth or lug 13 which engages in a longitudinal groove 14 in the shaft so that while the washer may slide along the shaft it will be constrained to rotate therewith. An expansion spring 15 is coiled about the shaft at the outer side of the washer and bears against the same and a second washer 16 which is slidably mounted on the shaft and is held against outward movement thereon by a nut 17, as clearly shown in Fig. 6. A sprocket chain 18 is trained about the sprocket 11 and about a second sprocket wheel 19 which is disposed at the side of the grain wheel 20 of the harvester and is connected with said wheel so as to rotate therewith.

The diameter of the grain wheel 20 is greater than that of the supplemental bull wheel 7 so that while the bull wheel 7 is traveling the distance of one circumference of said wheel, the grain wheel will rotate one full revolution and as the grain wheel has a greater circumference than the supplemental bull wheel, said grain wheel has a tendency to travel up the field just that much further and consequently force the binder around and effectually eliminate side draft. The difference in circumference between the grain wheel and supplemental bull wheel is taken up in slippage in the friction disk or in soft earth at the grain wheel. The same result may be obtained by making the sprocket on the shaft 5 larger than the sprocket wheel on the grain wheel.

At the right side of the machine, a bearing 21 is provided for the shaft 5 at the inner side of the universal joint and this bearing is carried by the lower end of a strap 22 which is secured to a rearwardly projecting frame bar 23 forming a part of the binder. Adjacent the supplemental bull wheel 7, a sleeve 24 is fitted about the shaft 5 and a lever member 25 rests upon this sleeve 24 and is held thereto by a clip 26 which depends from the member 25 and passes under the sleeve, as clearly shown in Fig. 4. The member 25 forms the rear section of a jointed lever, the front section 27 of which is pivotally connected with the front end of the member 25 by a suitable bolt, as shown at 28, and the front end portion of the section 27 is pivoted, as shown at 29, to a bar or bracket 30 which is secured to the side of the binder and extends laterally therefrom, as best shown in Fig. 2. The front extremity of the lever section 27 is formed with a lug or flange 31 which overhangs the bracket 30, as shown most clearly in Fig. 5, and a set bolt 32 is threaded through said lug or flange to bear upon the upper edge of the bracket and thereby adjust the lever so as to properly support the supplemental bull wheel at the desired height to attain the proper engagement of said wheel in the ground. The rear end of the lever section 27 is turned downwardly, as shown at 33, and to the extremity of said downturned end is attached the front end of a rectractile spring 34. The rear end of the spring 34 is engaged in an eye 35 formed at the front end of an adjusting screw 36 which passes loosely through a depending bracket 37 formed at the rear end of the lever section 25, a nut 38 being engaged on the rear extremity of the screw eye 36 and disposed at the rear of the bracket 37 whereby turning of the nut will adjust the tension of the spring and aid in maintaining the parts in the proper position. A supporting arm 39 is secured in any approved manner to some convenient fixed part of the binder frame and extends laterally therefrom to a point above and adjacent the lever section 25, an idler pulley 40 being carried by the free end of said arm, as will be understood upon reference to Fig. 4. A cable 41 is attached to the lever section 25 between the ends thereof and is trained over the idler 40 and then carried forwardly to the front truck 4 of the binder and attached to the axle of said truck in any preferred manner. I have shown a hook 42 mounted upon the axle of the truck and engaged by a link of a short chain 43 to which the front end of the cable is attached. The hook 42 may be adjusted along the truck axle to the position which will be found most advantageous in attaining the desired objects.

Ordinarily, self-binding harvesting machines have a pronounced tendency to swing to one side while traveling over the field and mowing the grain. When the described attachment is applied to the harvester, the supplemental bull wheel 7 takes into the ground and the tractive engagement of the wheel with the ground sets up a rotation through the shaft 5 which will be transmitted to the grain wheel 20 and, as the diameter of the grain wheel is greater than the diameter of the supplemental bull wheel said grain wheel will tend to force the binder around and eliminate side draft, as previously stated. When the machine is turning a corner, the front truck will, of course, swing about its own king bolt or pivotal connection with the frame of the harvester and will thereby exert a pull upon the cable 41 which will cause the lever section 25 to swing about its pivotal connection 28 with the front lever section and this upward movement of the lever section 25 will, of course, be applied directly to the end member of shaft 5 so that it will be swung upwardly and the supplemental bull wheel will be raised from the ground. The harvester can then be turned without any difficulty and the grain wheel may slip or slide relative to the main bull wheel 5' to accommodate the difference in the arcs defined by said wheels in turning. The spring 15 normally holds the sprocket 11 in close frictional engagement with the disk as it is secured upon the shaft 5 and, therefore, the motion of the shaft 5 will be positively transmitted to the grain wheel 20 and said wheel will be driven so that it will travel readily over the field without a tendency to cause a drag of the machine at the grain side. Should the grain wheel strike an immovable obstruction or the supplemental bull wheel be lifted from the ground so that the grain wheel will be rotating only under its tractive engagement with the ground, the sprocket wheel 11 may accelerate or retard its motion to conform to the speed of the grain wheel, the spring 15 yielding to accommodate the relative slip of the sprocket wheel, as will be understood. When the supplemental bull wheel is lifted from the ground as described, the spring 34 will be put under increased tension and will contract as the machine completes its turning movement and will thereby exert a downward pull upon the lever section 25 to supplement the force of gravity in returning the supplemental bull wheel to its working position.

My device is very simple and may be readily applied to any binder without entailing a heavy expense.

Having thus described the invention, I claim:

1. The combination with the grain wheel of a harvester, of a supplemental bull wheel disposed adjacent the opposite side of the harvester, a shaft mounted at the rear of the harvester and carrying said bull wheel, and gear connections between said shaft and the grain wheel of the harvester.

2. The combination with the grain wheel of a harvester, of a supplemental bull wheel disposed adjacent the opposite side of the harvester, a shaft mounted at the rear of the harvester and carrying said bull wheel, gear connections between said shaft and the grain wheel of the harvester, and means operatively connected with said shaft and the steering element of the harvester whereby when the machine turns a corner the shaft will be elevated and the supplemental bull wheel lifted from the ground.

3. The combination with a harvester including a grain wheel, of a side draft attachment comprising a shaft, means for mounting said shaft at the rear of the harvester, connections between said shaft and the grain wheel of the harvester, a supplemental bull wheel carried by said shaft adjacent the stubble side of the harvester, a jointed lever fulcrumed upon the side of the harvester and connected with said shaft, yieldable means connecting the sections of said lever whereby to maintain them normally in alinement, and means operatively connected with the rear section of said lever and the steering elements of the harvester whereby to lift the supplemental bull wheel when the harvester is making a turn.

4. A side draft attachment for harvesters comprising a bracket to be secured upon the side of the harvester, a jointed lever having one section pivotally mounted upon said bracket, a shaft having a bearing at the rear end of the rear section of said lever, a yieldable connection between the sections of the lever whereby they will be normally held in alinement, and means operatively connected with and forming a flexible connection between the rear section of the lever and the draft elements of the harvester whereby when the harvester makes a turn the rear section of the lever will be raised.

5. A side draft attachment for harvesters comprising a bracket to be secured upon the side of the harvester, a jointed lever pivoted adjacent its front end to said bracket, a set bolt mounted in the front end of the front section of said lever and bearing upon the bracket, the rear of the front section of the lever being turned downwardly, a shaft to be mounted at the rear of the harvester and having a bearing carried by the rear end of the rear section of the jointed lever, a supplemental bull wheel carried by the adjacent end of said shaft, a downturned bracket at the rear end of the rear section of the jointed lever, a retractile spring having its front end attached to the rear extremity of the front section of the jointed lever, and a screw eye attached to the rear end of said spring and adjustably mounted in the bracket at the rear end of the lever.

6. The combination with the grain wheel of a harvester, of a supplemental bull wheel of less diameter than said grain wheel disposed adjacent the opposite side of the harvester, a shaft mounted at the rear of the harvester and carrying said supplemental bull wheel, sprocket wheels secured to the grain wheel and shaft respectively, and a sprocket chain traveling around and engaging the sprocket wheels.

7. The combination with the grain wheel of a harvester, of a supplemental bull wheel of less diameter than said grain wheel disposed adjacent the opposite side of the harvester, a shaft mounted at the rear of the harvester and carrying said supplemental bull wheel, a sprocket wheel loose on the shaft, a friction disk engaging the sprocket wheel, a sprocket wheel secured to the grain wheel, and means forming a connection between said sprocket wheels whereby the travel of the grain wheel will tend to force the harvester around and prevent side draft.

LUTIE A. ROGGENSACK. [L. S.]